United States Patent [19]

Fischer

[11] Patent Number: 4,674,051

[45] Date of Patent: Jun. 16, 1987

[54] NAVIGATION POINT LOCATING SYSTEM

[75] Inventor: Michael T. Fischer, Norwalk, Calif.

[73] Assignee: Sundstrand Data Control, Inc., Redmond, Wash.

[21] Appl. No.: 736,453

[22] Filed: May 21, 1985

[51] Int. Cl.⁴ .......................... G01S 5/00; G06F 15/50
[52] U.S. Cl. ..................................... 364/443; 364/445; 364/449; 342/401; 342/404
[58] Field of Search ............... 364/449, 443, 450–453, 364/460; 342/389, 399, 401, 404; 73/178 R

[56] References Cited

U.S. PATENT DOCUMENTS

| | | | |
|---|---|---|---|
| 3,947,849 | 3/1976 | Fehlner et al. | 342/389 |
| 3,975,731 | 8/1976 | Latham et al. | 364/451 X |
| 4,134,117 | 1/1979 | Robinson et al. | 364/449 X |
| 4,212,067 | 7/1980 | Henderson | 364/460 |
| 4,220,994 | 9/1980 | Hendrickson | 364/450 |
| 4,583,177 | 4/1986 | Meyer | 364/451 |

Primary Examiner—Felix D. Gruber
Assistant Examiner—Thomas G. Black
Attorney, Agent, or Firm—Mason, Kolehmainen, Rathburn & Wyss

[57] ABSTRACT

A system for determining the closest navigation point to an aircraft utilizes a sphere of influence principle wherein the earth is subdivided into a plurality of geographic areas, for example, one quarter degree squares of latitude and longitude. An identifier such as an index number of the closest navigation point to each square is stored in a look up table. Position information from the navigation system of the aircraft is used to address the look up table to retrieve the appropriate index number which is then used to address a second look up table that contains information defining the closest navigation point.

16 Claims, 4 Drawing Figures

Fig. 3

SPHERE OF INFLUENCE FILE

| GX, GY | INDEX NUMBER OF CLOSEST NAVIGATION POINT |
|---|---|
| 1, 1 | 2 |
| 1, 2 | 2 |
| 1, 3 | 6 |
| ⋮ | ⋮ |
| 1, 19 | 10 |
| 2, 1 | 2 |
| 2, 2 | 6 |
| 2, 3 | 6 |
| ⋮ | ⋮ |

Fig. 4

VOR/AIRPORT FILE

| INDEX NUMBER | LOCATION IDENTIFIER | LAT./LONG. | FREQUENCY | OTHER |
|---|---|---|---|---|
| 1 | AAA | XXX/YYY | 116.1 MHz | --- |
| 2 | BQC | | | |
| 3 | COM | | | |
| 4 | EED | | | |
| 5 | FOR | | | |
| 6 | KLAX | | | |
| 7 | KSFD | | | |
| ⋮ | ⋮ | ⋮ | ⋮ | ⋮ |

NAVIGATION POINT LOCATING SYSTEM

BACKGROUND OF THE INVENTION

1. Field of the Invention

This invention relates generally to navigation systems, and more particularly to systems for determining the closest navigation point such as an airport or a very high frequency omni-range (VOR) navigational ground station to the aircraft.

2. Description Of The Prior Art

It is desirable to be able to determine the position relative to the aircraft of the closest navigation point such as a VOR or airport so that the appropriate VOR may be tuned in and the closest airport be known in the event of an emergency. The determination of the closest navigation point may be done either manually through the use of navigation charts or automatically by feeding the position of the aircraft into a computer that has stored therein location and other information for each navigation point. While these systems do provide a way to find the closest navigation point, the use of navigation charts requires that large and cumbersome charts covering the area over which the aircraft is flying be carried and requires an experienced navigator to make judgments as to the closest navigation point. In present computer based systems, data defining each navigation point in the world, for example, approximately 3600 VORs and 6000 airports is stored in a memory. The stored information for each navigation point includes a location identifier (such as an airport identifying word), latitude and longitude coordinates for the navigation point, the frequency of the transmissions from the navigation point, elevation and other related data. Typically the file is ordered alphabetically by the location identifier word, and in order to determine the closest navigation point to the present position, the coordinates of each of the 3600 VORs and 6000 airports are compared with the present position of the aircraft. Because of the number of comparisons that must be made, such a system does not make optimum use of computing capacity and computing time. The invention eliminates such a comparison requirement, and substitutes a look-up table approach.

SUMMARY OF THE INVENTION

Accordingly, it is an object of the present invention to provide a system for determining the closest navigation point that overcomes many of the disadvantages of the prior art systems.

It is another object of the present invention to provide a system that determines the closest navigation point by determining the geographic area in which the aircraft is flying and considering only those navigation points within that geographic area in determining the closest navigation point.

It is yet another object of the present invention to provide a system that determines the closest navigation point to an aircraft by dividing the world into a matrix defining a plurality of geographic areas, determining an identifier such as an index number for the closest navigation point to that area and utilizing that index number to define that particular navigation point.

It is yet another object of the present invention to provide a system that divides the world into a plurality of geographic areas and stores in a look up table an identifier such as an index number corresponding to the closest navigation point to that geographic area. The position of the aircraft is used to address the look up table to determine the index number of the closest navigation point, and the index number thus retrieved is used to address a second look up table that provides the necessary information about the navigation point.

These and other objects of and inventions of the present invention will become readily apparent upon consideration of the following detailed description and attached drawing wherein:

FIG. 3 is a table illustrating how data is stored in the sphere of influence chart of FIG. 1; and FIG. 4 is a chart illustrating how data is stored in the VOR or airport file of FIG. 1.

DETAILED DESCRIPTION OF THE PREFERRED EMBODIMENT

Figure 1:
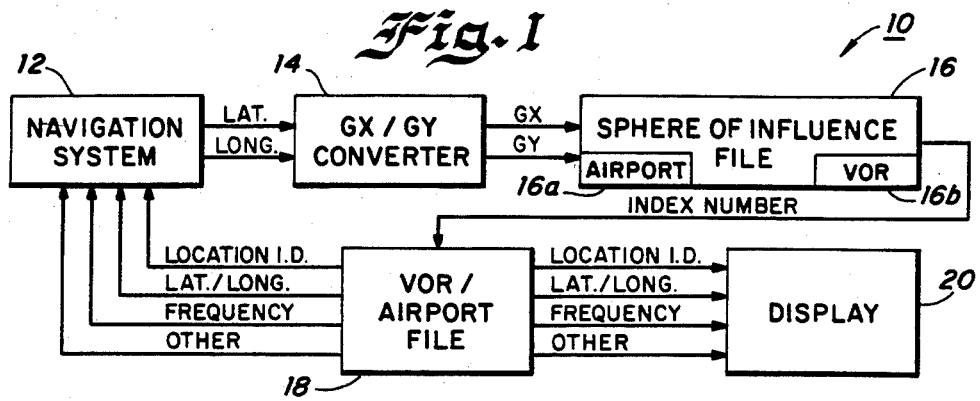
FIG. 1 is a block diagram of the system according to the invention.

Referring now to the drawing, with particular attention to FIG. 1, there is shown a block diagram of the system according to the invention generally designated by the reference numeral 10. Although the system according to the invention is illustrated as a series of functional blocks for purposes of clarity, it is to be understood that the actual implementation of the system may be other than as specifically shown in FIG. 1, with various analog and digital implementations being possible. The system 10 utilizes signals from a navigation system 12, which may include an inertial navigation system, a satellite navigation receiver, VLF/OMEGA, Loran C, VOR/DME or DME/DME, or may be part of a flight management system.

Latitude and longitude information defining the position of the aircraft is applied to a GX/GY converter which defines a square or a rectangular area within which the aircraft is located. In the illustrated embodiment, the GX and GY coordinates define areas of one quarter degree of longitude and latitude, respectively, but larger or smaller areas can be defined. The latitude and longitude numbers are converted to the coordinate GX and GY by the following equations:

$$GX = \frac{\text{longitude} + \frac{1}{8}°}{\frac{1}{4}°}$$

$$GY = \frac{\text{latitude} + \frac{1}{8}°}{\frac{1}{4}°}$$

In order to obtain the GX and GY coordinates, which in the present embodiment define the centers of geographic areas of one quarter degree of latitude and longitude, the longitude and latitude are inserted into the above equations to generate a number that has an integer and a fractional component. The fractional component is truncated and the integer defines the appropriate GX or GY coordinate.

The GX and GY coordinates thus obtained are applied to a sphere of influence file 16 which may be a look up table that contains an identifier such as an index number that defines the nearest navigation point to that area. The sphere of influence file may contain a single file that provides the index numbers of both VORs and airports or may contain two separate files, one containing the index numbers of the closest airports and another containing the index numbers of the closest VORs, such as the files 16a and 16b, respectively. The index number thus addressed by the GX and GY coordinates is applied to a VOR/airport file 18 which contains particular information about each navigation point. As in the case of the sphere of influence file 16, the VOR/airport file may be a single file having information containing information about both airports and VORs or may contain two separate files, one containing information about airports and the other containing information about VORs. The index number addresses the location containing the information about the nearest navigation point and causes the VOR/airport file to output information such as the location identification word of the navigation point, its latitude and longitude, its operating frequency and other information, such as, for example, whether the navigation point is a VOR or an airport, its elevation and other information if desired. If desired, it may be specified, for example, by the navigation system 12, whether the closest VOR or airport is desired. In such an event, the appropriate airport file 16a or VOR file 16b is addressed, and the index number of the closest airport or VOR, whichever is desired, is retrieved from the sphere of influence file 16. This index number is then applied to the appropriate file in the VOR/airport file so that the information defining the closest VOR or airport, whichever is appropriate, is provided. This information is applied to a display 20, which may be a cathode ray tube, or to another utilization device, such as, for example, a device that automatically tunes the VOR navigation receiver to the nearest VOR or airport.

The information from the VOR/airport file may also be applied to the navigation system 12, particularly if the navigation system 12 is a software system of the type that determines the best route between two points. For example, the best route between two points is generally a great circle route in terms of minimizing the distance between the two points; however, a great circle route is not always the best route in terms of air traffic control, and a route flying over the VORs between the two points may be preferable from an air traffic control standpoint. Thus, to optimize the path between the two points, the navigation system 12 may be programmed to fly a great circle route, and during the flight, the great circle route may be modified by information from the VOR/airport file so that the aircraft flys over the closest VORs to the great circle route. Thus, the navigation system 12, in combination with the system according to the invention, determines the best route for the flight planning system, with the sphere of influence system according to the invention being used to determine the closest VORs or airports to an optimized or great circle route.

Figure 2:
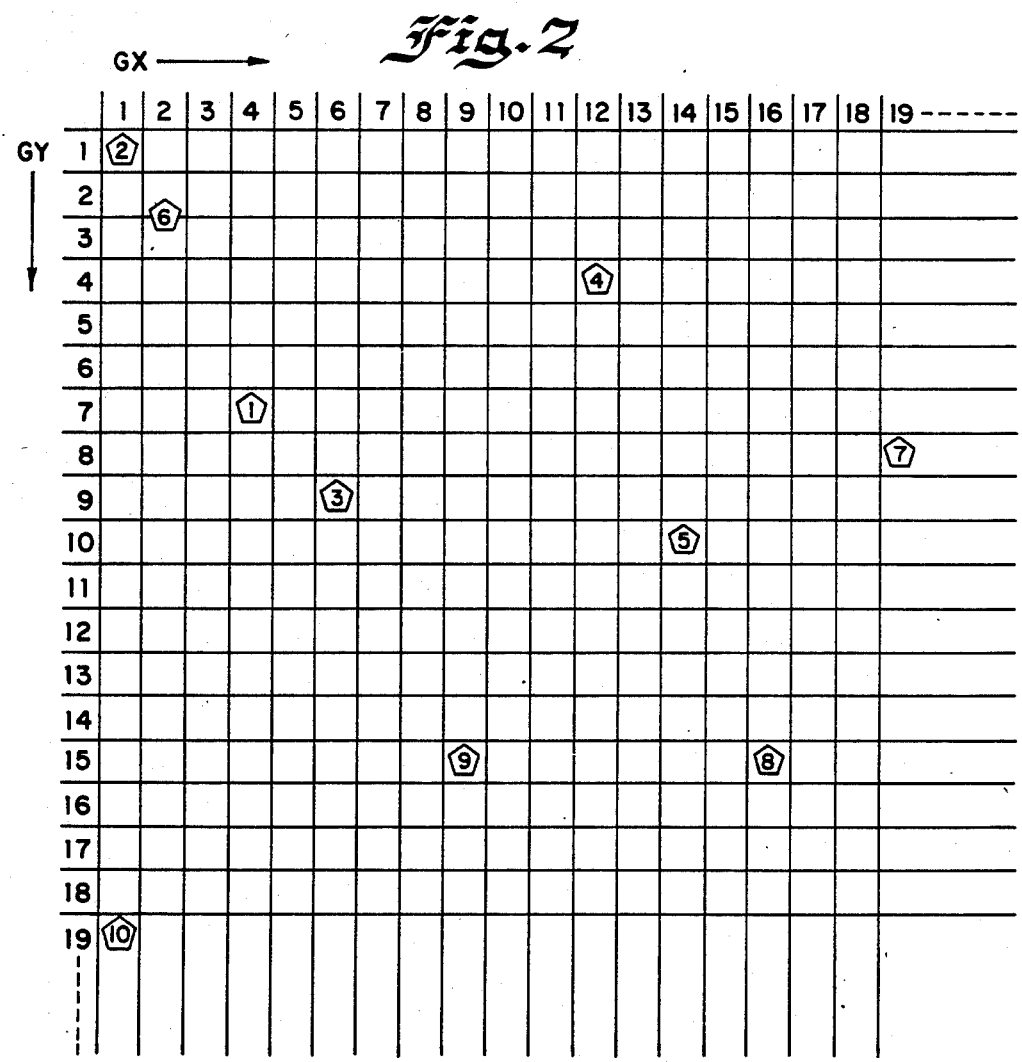
FIG. 2 is a chart illustrating how the earth is divided into small geographic areas by the system according to the invention.

Referring now to FIG. 2, there is shown a geographic area having a plurality of navigation points each bearing an index number. The navigation points may be VORs, as is illustrated in FIG. 2, or they may be airports which may be stored in a single file containing both VORs and airports or in a separate file. The GX and GY coordinates define the center of each area and a matrix defining the areas is superimposed over the locations of the VORs and airports. While a system defining areas of one quarter degree latitude and one quarter degree longitude, as in the illustrated embodiment, would have values of GX and GY ranging from 1 through 1440 ($360° \times 4$) the values of GX and GY in FIG. 2, only 19 values of GX and GY have been illustrated in FIG. 2 for purposes of clarity.

Each navigation point such as a VOR or airport exercizes a sphere of influence over the closest areas to which it is located, and the index number of the closest VOR or airport to each area of the matrix, as defined by the GX and GY coordinates, is stored in the sphere of influence file 16 as is illustrated in FIG. 3. For example, the closest navigation point to the area defined by the GX, GY coordinate 1, 1 is the point 2 because it is located within the the area defined by 1, 1 coordinate. Similarly, the navigation point bearing the index number 2 is the closest airport to the areas defined by the 1, 2 and 2, 1 coordinates because those areas are located immediately adjacent to the area defined by the 1, 2 coordinate. The point 6 is located between the areas defined by the 2, 2 and the 2, 3 coordinates, and hence it is the closest nagivation point to the 1, 3, the 2, 2 and the 2, 3 coordinate areas. Thus, the sphere of influence file contains the index number of the closest navigation point (VOR or airport) to each area, and by utilizing the latitude and longitude information from the navigation system 12, converting it to GX and GY coordinates and using the GX and GY coordinates to address the sphere of influence file 16, the index number of the closest VOR or airport is readily obtained. The index number from the sphere of influence file 16 is used to address the VOR/airport file 18 which may be a single combined file or segregated VOR and airport files which contain specific information about each of the VORs or airports. The information relating to the various VORs and airports is stored in the VOR/airport file as illustrated in FIG. 4. For example, the various VORs and airports may be listed in alphabetical order in one or two files according to their location identifier and given sequential index numbers according to their alphabetical order. The latitude and longitude, the operating frequency and whatever other information is desired to define each navigation point is stored in the VOR airport file. Thus, when the VOR/airport file is accessed according to index number, the appropriate information for that particular index number is accessed and applied to the navigation system 12. The information may also be displayed, for example, on the display 20 for the pilot's information.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A system for automatically determining the closest navigation point to a vehicle and the parameters thereof comprising:

means defining a matrix of geographic areas, each geographic area of the matrix having associated therewith an identifier representing the closest navigation point to said area, said matrix defining means being responsive to signals representative of the geographic position of the vehicle for retrieving the identifier associated with the geographic area in which the vehicle is located and providing a signal representative of said identifier; and means having stored therein data defining predetermined parameters of a plurality of navigation points, each of said navigation points being identified by one of said identifiers, said storing means being responsive to the identifier representative signal received from said matrix defining means for retrieving the parameters of the navigation point identified by a particular identifier and providing a signal representative of said parameters.

2. A system as recited in claim 1 wherein said predetermined parameter storing means includes means for storing the locations of said navigation points.

3. A system as recited in claim 1 wherein said parameter storing means includes means for storing indications identifying each of said navigation points.

4. A system as recited in claim 1 wherein said parameter storing means includes means defining the operating frequencies of said navigation points.

5. A system as recited in claim 4 further including a navigation system responsive to signals received from navigation points, said navigation system including means responsive to the operating frequency retrieved from said parameter storing means for automatically tuning said navigation system to the operating frequency of the nearest navigation point.

6. A system as recited in claim 1 wherein said matrix defining means includes a look up table.

7. A system as recited in claim 1 wherein said parameter storing means includes a look up table.

8. A system as recited in claim 1 further including a navigation system programed to define a predetermined route, said navigation system being responsive to predetermined parameters retrieved from said parameter storing means for modifying the predetermined route in accordance therewith.

9. A system for automatically determining the closest navigation point to a vehicle and the parameters thereof comprising:
   means responsive to signals representative of the geographic position of the vehicle for defining an area in which the vehicle is located;
   means defining a matrix of geographic areas, each geographic area having associated therewith an identifier representing the closest navigation point to said area, said matrix defining means being responsive to the area defined by said area defining means for providing a particular identifier associated with the geographic area in which the vehicle is located; and
   means having stored therein data defining predetermined parameters of a plurality of navigation points, each of said navigation points being identified by one of said identifiers, said storing means being responsive to particular identifiers received from said matrix defining means for providing the parameters of the navigation point identified by the particular identifier received.

10. A system as recited in claim 9 wherein said predetermined parameter storing means includes means for storing the locations of said navigation points.

11. A system as recited in claim 9 wherein said parameter storing means includes means for storing indications identifying each of said navigation points.

12. A system as recited in claim 9 wherein said parameter storing means includes means defining the operating frequencies of said navigation points.

13. A system as recited in claim 12 further including a navigation system responsive to signals received from navigation points, said navigation system including means responsive to the operating frequency provided by said parameter storing means for automatically tuning said navigation system to the operating frequency of the nearest navigation point.

14. A system as recited in claim 9 wherein said matrix defining means includes a look up table.

15. A system as recited in claim 9 wherein said parameter storing means includes a look up table.

16. A system as recited in claim 9 further including a navigation system programed to define a predetermined route, said navigation system being responsive to predetermined parameters provided by said parameter storing means for modifying the predetermened route in accordance therewith.

* * * * *

UNITED STATES PATENT AND TRADEMARK OFFICE
CERTIFICATE OF CORRECTION

PATENT NO. : 4,674,051

DATED : June 16, 1987

INVENTOR(S) : MICHAEL T. FISCHER

It is certified that error appears in the above-identified patent and that said Letters Patent is hereby corrected as shown below:

Column 2, delete the second equation appearing at line 49 and replace it with $$--GY = \frac{\text{latitude} + 1/8°}{1/4°} --.$$

Column 2, line 6, delete "of and inventions" and substitute therefor --and advantages--.

Signed and Sealed this

Eighth Day of December, 1987

Attest:

DONALD J. QUIGG

*Attesting Officer*            *Commissioner of Patents and Trademarks*